US012811030B2

(12) United States Patent
Nakayama et al.

(10) Patent No.: US 12,811,030 B2
(45) Date of Patent: Nov. 24, 2026

(54) INFORMATION MANAGEMENT SYSTEM AND INFORMATION MANAGEMENT METHOD

(71) Applicant: SUMITOMO ELECTRIC INDUSTRIES, LTD., Osaka (JP)

(72) Inventors: Shuhei Nakayama, Osaka (JP); Fumiaki Sato, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 204 days.

(21) Appl. No.: 18/768,238

(22) Filed: Jul. 10, 2024

(65) Prior Publication Data

US 2025/0022632 A1 Jan. 16, 2025

(30) Foreign Application Priority Data

Jul. 12, 2023 (JP) ................................ 2023-114443

(51) Int. Cl.
*H01B 7/36* (2006.01)

(52) U.S. Cl.
CPC .................................... *H01B 7/365* (2013.01)

(58) Field of Classification Search
CPC ...................................................... H01B 7/365
USPC ..................................................... 235/462.01
See application file for complete search history.

(56) References Cited

U.S. PATENT DOCUMENTS

| | | | | |
|---|---|---|---|---|
| 2012/0221986 | A1* | 8/2012 | Whitford | G06F 30/13 716/100 |
| 2021/0073449 | A1* | 3/2021 | Segev | G06F 30/27 |
| 2024/0378332 | A1* | 11/2024 | Butts, Jr. | G06F 30/20 |
| 2026/0066631 | A1* | 3/2026 | Sato | H02G 1/08 |

FOREIGN PATENT DOCUMENTS

| | | |
|---|---|---|
| JP | 2001-021730 A | 1/2001 |

* cited by examiner

*Primary Examiner* — Daniel A Hess
(74) *Attorney, Agent, or Firm* — McDonald Hopkins LLC

(57) ABSTRACT

An information management system includes: an obtaining unit configured to obtain cable information on installation of a cable and duct information on installation of a duct in which the cable is to be installed; and a calculation unit configured to calculate an installation condition that is recommended when installing the cable inside the duct, based on the duct information and the cable information. The cable information is stored in at least one first code attached to the cable, and the duct information is stored in at least one second code attached to the duct.

7 Claims, 8 Drawing Sheets

INFORMATION MANAGEMENT SYSTEM AND INFORMATION MANAGEMENT METHOD

TECHNICAL FIELD

The present disclosure relates to an information management system and an information management method. This application is based on and claims priority under 35 USC 119 from Japanese Patent Application No. 2023-114443 filed on Jul. 12, 2023, the contents of which are incorporated herein by reference.

BACKGROUND

In the related art, at a cable-installation site, a worker carries a cable specification sheet and performs installation work while checking various parameters related to installation, such as an allowable tension of a cable, described in the specification sheet. In addition, in order to avoid carrying a paper specification sheet to the installation site, for example, JP2001-021730A discloses a method of providing recording means for encoding and recording installation-related information on an optical cable at or near the optical cable that has been installed, and recording and reading out the installation-related information on the optical cable at a site where the optical cable has been installed.

SUMMARY

The present disclosure provides an information management system including an obtaining unit configured to obtain cable information on installation of a cable and duct information on installation of a duct in which the cable is to be installed; and a calculation unit configured to calculate an installation condition that is recommended when installing the cable inside the duct, based on the duct information and the cable information, in which: the cable information is stored in at least one first code attached to the cable; and the duct information is stored in at least one second code attached to the duct.

The present disclosure provides an information management method including: obtaining cable information on installation of a cable, the cable information being stored in at least one first code attached to the cable; obtaining duct information on installation of a duct in which the cable is to be installed, the duct information being stored in at least one second code attached to the duct; and calculating an installation condition that is recommended when installing the cable inside the duct, based on the duct information and the cable information.

DETAILED DESCRIPTION

Figure 1:
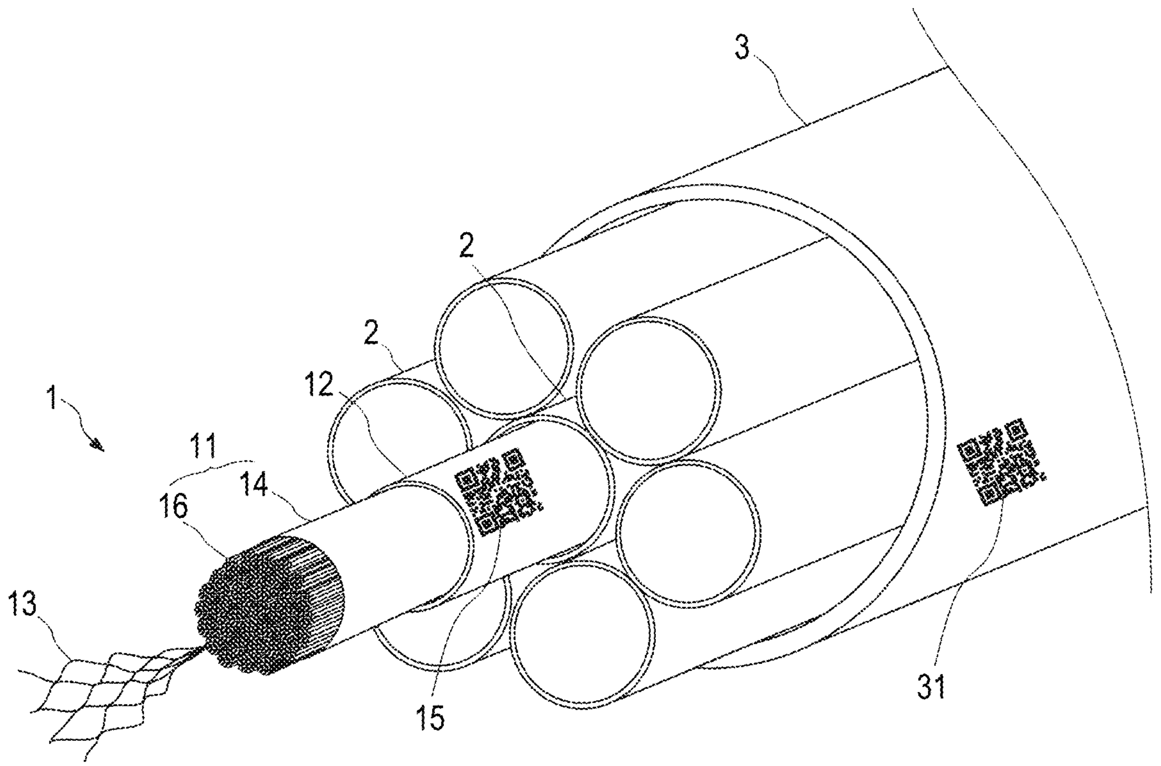
FIG. 1 is a perspective view showing an example of a cable, a sub-duct, and a main duct for which an information management system according to an embodiment of the present disclosure is used.

The worker has determined installation conditions such as tension and temperature at the time when installing the cable based on various parameters related to installation of the cable, experience of the worker, and the like. For this reason, there was a possibility that it would be difficult for a less-experienced worker to determine appropriate installation conditions. In addition, there was a possibility that even a skilled worker would require a lot of effort to determine installation conditions while checking a plurality of parameters related to the installation of a cable.

An object of the present disclosure is to provide an information management system and an information management method that enable a worker who performs installation work of a cable to easily obtain appropriate installation conditions.

According to the present disclosure, it is possible to enable a worker who performs installation work of a cable to easily obtain appropriate installation conditions.

Description of Embodiments of Present Disclosure

First, embodiments of the present disclosure are listed and described.

(1) An information management system according to an embodiment of the present disclosure includes: an obtaining unit configured to obtain cable information on installation of a cable and duct information on installation of a duct in which the cable is to be installed, and a calculation unit configured to calculate an installation condition that is recommended when installing the cable inside the duct, based on the duct information and the cable information, in which: the cable information is stored in at least one first code attached to the cable; and the duct information is stored in at least one second code attached to the duct.

In this way, by reading the first code attached to the cable and the second code attached to the duct in which the cable is to be installed, the recommended installation condition is automatically calculated, so a worker can easily obtain an appropriate installation condition at an installation site.

(2) The information management system of the above (1), in which: the duct may include a plurality of sections; and the duct information may include information on installation of the duct in each of the sections.

With such a configuration, even when the duct includes a plurality of sections with different shapes in terms of a length, a bending angle, an inclination, and the like, appropriate installation conditions can be calculated, considering the shape of each section.

(3) The information management system of the above (1) or (2), in which: the at least one first code may include a plurality of first codes attached to the cable along a longitudinal direction of the cable; the cable information stored in each of the plurality of first codes may include position information indicating a position where a corresponding one of the plurality of first codes is attached;

the obtaining unit may be configured to obtain the position information of at least one of the plurality of first codes after installation of the cable; and the calculation unit may be configured to calculate a length of the installed cable based on the position information obtained by the obtaining unit.

In this way, with the configuration of calculating the actual length of the installed cable, for example, by comparing an estimated blowing distance calculated before installation and a length of the cable after actually installed, the calculation accuracy of an estimated blowing distance for next and subsequent times can be improved.

(4) The information management system of any one of the above (1) to (3) may further include a storage unit configured to store the cable information and the duct information in association with each other.

In this way, with the configuration in which the cable information and the duct information of the duct in which the cable is installed are stored in association with each other, it is possible to present useful information to a worker, for example, when performing maintenance and management of the cable.

(5) An information management method according to an embodiment of the present disclosure includes: obtaining cable information on installation of a cable, the cable information being stored in at least one first code attached to the cable; obtaining duct information on installation of a duct in which the cable is to be installed, the duct information being stored in at least one second code attached to the duct; and calculating an installation condition that is recommended when installing the cable inside the duct, based on the duct information and the cable information.

In this way, with the method of calculating an installation condition that is recommended when installing a cable inside a duct on the basis of the cable information stored in the first code attached to the cable and the duct information stored in the second code attached to the duct in which the cable is to be installed, a worker can easily obtain an appropriate installation condition at an installation site.

Details of Embodiments of Present Disclosure

A specific example of the present disclosure will be described below with reference to the drawings. Note that the present invention is not limited to these examples, is defined by the claims, and is intended to include all changes made within the meaning and scope equivalent to the claims.

<Configurations of Cable, Sub-Duct and Main Duct>

FIG. 1 is a perspective view showing an example of a cable 1, a sub-duct 2, and a main duct 3 for which an information management system 100 according to an embodiment of the present disclosure is used. As shown in FIG. 1, the sub-duct 2 is installed inside the main duct 3, and the cable 1 is further installed inside the sub-duct 2. In FIG. 1, one cable 1 is installed inside one sub-duct 2. However, a plurality of cables 1 may be installed inside one sub-duct 2.

The cable 1 is a micro-duct cable that is to be installed inside the sub-duct 2 by, for example, air blowing or traction, and has an outer diameter of approximately 20 mm. Note that in a case of the cable 1 of which a sheath surface has a small radius of curvature, it becomes difficult to read a first code 15, which will be described below, so the outer diameter of the cable 1 is preferably 6 mm or greater.

The cable 1 is, for example, an optical fiber cable and includes a cable core 11 and a sheath 12 formed around the cable core 11. The cable core 11 includes optical fiber ribbons 16 each including a plurality of optical fibers 13, and an outer winding tape 14 covering a periphery of the plurality of optical fiber ribbons 16. As for the optical fibers 13 configuring the optical fiber ribbon 16, for example, the optical fibers 13 adjacent to each other may be intermittently connected along a longitudinal direction of the cable 1. Note that the cable 1 shown in FIG. 1 is a slotless type, but may also be a slot type.

The outer winding tape 14 is wound longitudinally or horizontally around the plurality of optical fiber ribbons 16. The sheath 12 is made of a resin such as high-density polyethylene (HDPE), and is formed by extrusion molding around the outer winding tape 14. In addition, the sheath 12 may be formed of a material containing silicone added within a range of 0.1 mass % to 0.5 mass %. In this case, when installing the cable 1 inside the sub-duct 2, the sheath 12 can be made to slip easily in a state in which the sheaths 12 are in contact with each other or the sheath 12 and the sub-duct 2 are in contact with each other, so the cable 1 can be easily installed.

A first code 15 is attached to the sheath 12. In the first code 15, cable information on installation of the cable 1 is stored. In addition, a second code 31 is attached to the main duct 3. In the second code 31, duct information on installation of the main duct 3 is stored.

In the example shown in FIG. 1, a QR code (registered trademark) that can record a lot of information such as letters and numbers and enables high-speed reading by combining white cells and black cells is attached as the first code 15 and the second code 31. The first code 15 and the second code 31 may be printed using an inkjet printer or the like, or may be laser engraved.

In addition, instead of printing or engraving the first code 15 directly on the cable 1, paper on which the first code 15 is printed, an IC chip, or the like may be attached to the cable 1. Additionally, instead of printing or engraving the second code 31 directly on the main duct 3, paper on which the second code 31 is printed, an IC chip, or the like may be attached to the main duct 3.

The first code 15 may have a color different from a color of the sheath 12. Thereby, a position where the first code 15 is attached can be easily confirmed. In addition, the second code 31 may have a color different from a color of the main duct 3. Thereby, a position where the second code 31 is attached can be easily confirmed.

The cable information includes, for example, at least one of a plurality of pieces of information on the cable 1 such as a manufacturing company, a manufacturing year, a management number, an outer diameter, a mass, a coefficient of friction, a rigidity, a number of optical fibers, an allowable tension, an allowable bending diameter, and an operating temperature. The duct information includes, for example, at least one of a plurality of pieces of information on the main duct 3 such as a manufacturing company, a manufacturing year, a management number, an inner diameter, a length, a bending angle, and an inclination.

Note that the second code 31 is not limited to being attached to the main duct 3, and may also be attached to the sub-duct 2. In a case where the second code 31 is attached to the sub-duct 2, the second code 31 includes at least one of a plurality of pieces of information on the sub-duct 2 such as a manufacturing company, a manufacturing year, a management number, an inner diameter, a length, a bending angle, and an inclination.

<Configuration of Information Management System>

Figure 2:
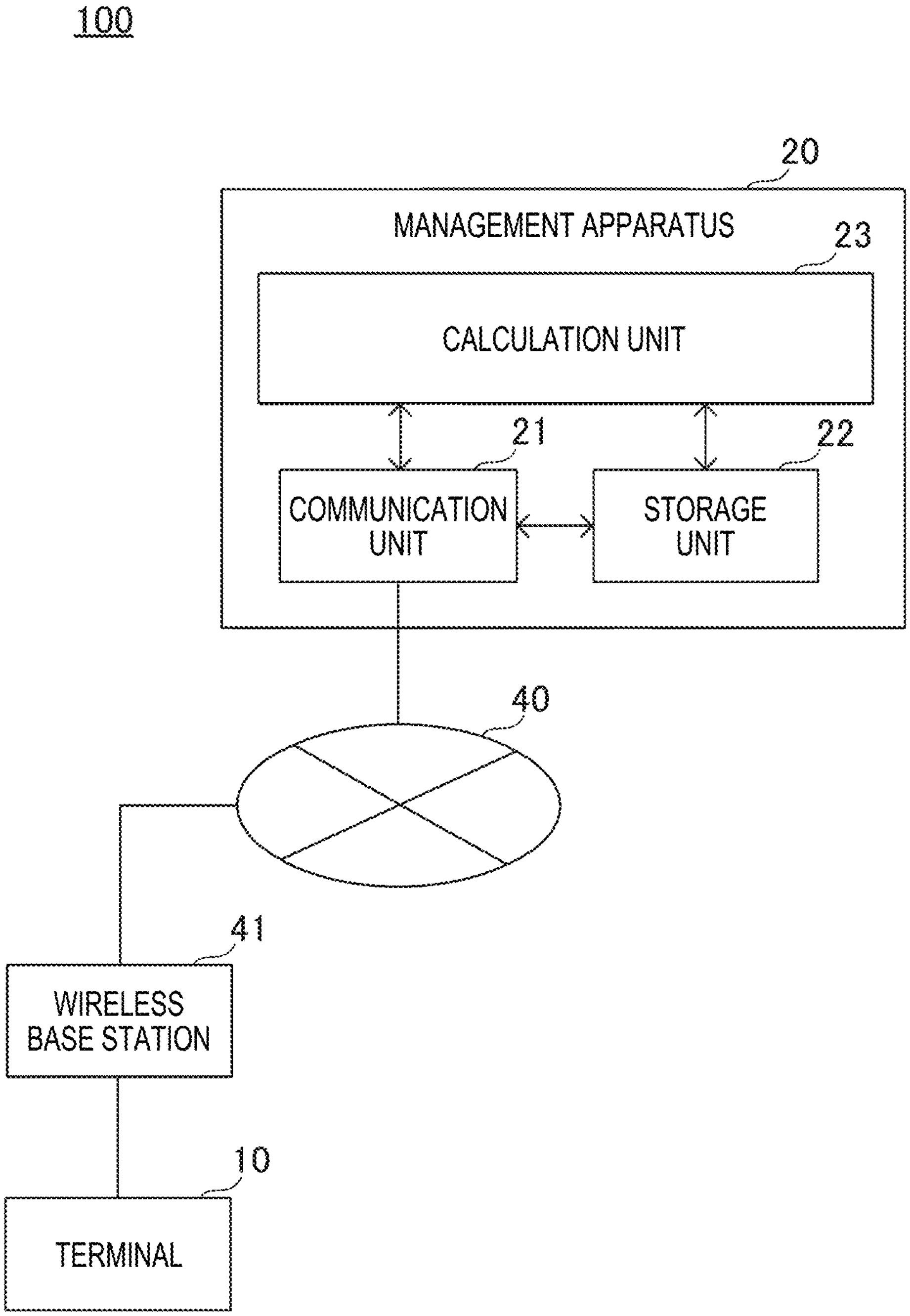
FIG. 2 is a block diagram showing a configuration of an information management system according to an embodiment of the present disclosure.

FIG. 2 is a block diagram showing a configuration of an information management system 100 according to an embodiment of the present disclosure. Referring to FIG. 2, the information management system 100 includes a terminal (obtaining unit) 10 and a management device 20. The terminal 10 and the management device 20 are communicatively connected via an external network 40 such as the Internet and a wireless base station 41. The terminal 10 is, for example, a smart phone used by a worker who installs the cable 1, and has a shooting function and a display function.

(Obtaining of Cable Information and Duct Information)

Figure 3:
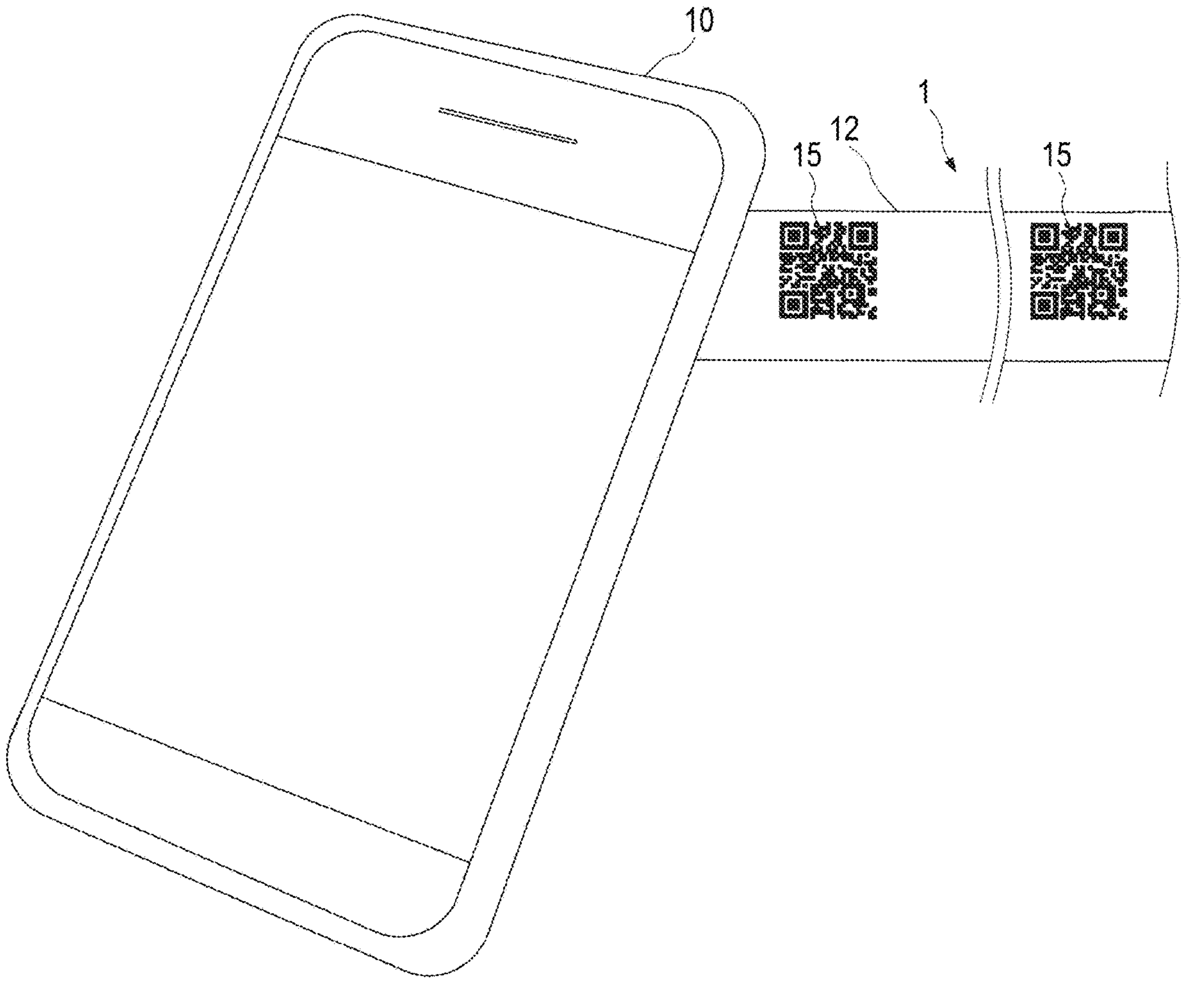
FIG. 3 is a view showing an example of a method for reading cable information stored in a first code shown in FIG. 1.

FIG. 3 is a view showing an example of a method for reading the cable information stored in the first code 15 shown in FIG. 1. As shown in FIG. 3, the first codes 15 are attached to the sheath 12 of the cable 1 at a plurality of positions at predetermined intervals, for example, along the longitudinal direction of the cable 1. The predetermined interval is, for example, within a range of 30 cm to 1 m. The cable information stored in each of the first codes 15 includes position information of a position where the first code 15 is attached, in addition to the information on a manufacturing company, a manufacturing year, a management number, an outer diameter, a mass, a coefficient of friction, a rigidity, a number of optical fibers, an allowable tension, an allowable bending diameter, and an operating temperature. For example, positional information indicating a distance from a reference point of the cable 1 is stored as the cable information in each of the first codes 15.

Similarly, also in the main duct 3 shown in FIG. 1, the second codes 31 are attached at a plurality of positions at predetermined intervals along a longitudinal direction of the main duct 3. The predetermined interval is, for example, within a range of 30 cm to 1 m. In the plurality of second codes 31 attached to the same main duct 3, the same duct information is stored, but different duct information may also be stored. For example, position information on a position where the second code 31 is attached may be stored in the second code 31.

Figure 4:
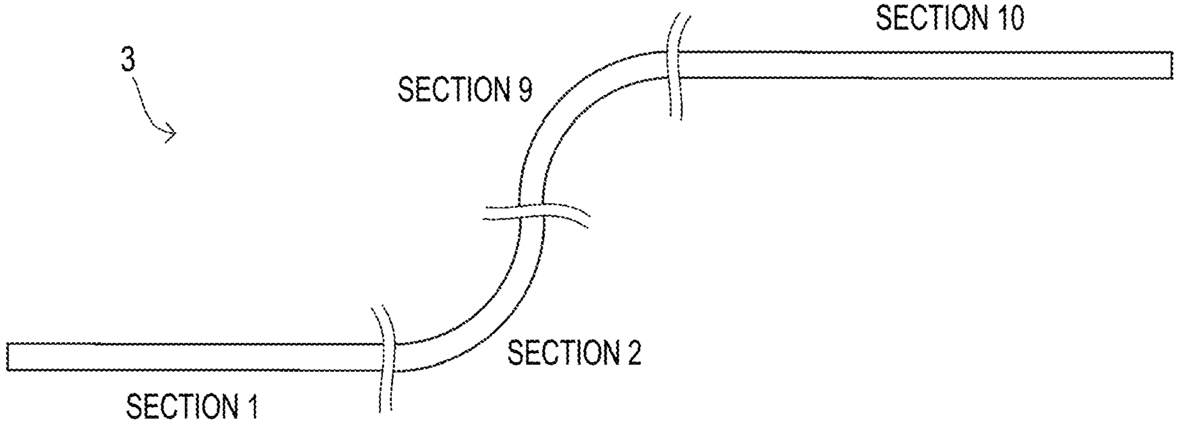
FIG. 4 is a view showing an example of an overall schematic shape of a main duct for which the information management system shown in FIG. 2 is used.

FIG. 4 is a view showing an example of an overall schematic shape of the main duct 3 for which the information management system 100 shown in FIG. 2 is used. For example, the main duct 3 has a plurality of sections. At least two of the plurality of sections have different values of various parameters related to installation, such as a length, a bending angle, and a slope. In this case, the duct information stored in the second code 31 includes information on installation in all sections.

The terminal 10 shown in FIG. 3 captures the first code 15 attached to the cable 1 and reads the cable information stored in the first code 15. In addition, the terminal 10 captures the second code 31 attached to the main duct 3 and obtains the duct information stored in the second code 31. Then, the terminal 10 transmits the read cable information and duct information to the management device 20 via the wireless base station 41 and the external network 40 shown in FIG. 2.

(Calculation and Display of Installation Conditions)

As shown in FIG. 2, the management device 20 includes a communication unit 21, a storage unit 22, and a calculation unit 23. The communication unit 21 receives the cable information and duct information transmitted from the terminal 10, and outputs the cable information and duct information to the calculation unit 23. The calculation unit 23 calculates installation conditions that are recommended when installing the cable 1 inside the main duct 3, based on the cable information and the duct information.

More specifically, one or more calculation formulas used for calculating installation conditions are stored in the storage unit 22. For example, a magnitude of friction occurring between the main duct 3 and the cable 1 changes in accordance with a bending angle of the main duct 3, so an estimated blowing distance of the cable 1 changes. Relational expressions between values of various parameters related to the installation of the cable 1 and values of various parameters related to the installation of the main duct 3 are stored in the storage unit 22 as calculation formulas used for calculating installation conditions.

The calculation unit 23 calculates optimal installation conditions such as an estimated blowing distance, an allowable maximum tension, a recommended installation temperature, and the like when installing the cable 1 in the main duct 3, by using the cable information, the duct information, and one or more calculation formulas stored in the storage unit 22.

Here, as shown in FIG. 4, it is assumed that the main duct 3 has a plurality of sections, and the duct information includes all information for each section. In this case, the calculation unit 23 calculates the optimal installation conditions by using statistical values of values for each section, such as an average value or maximum value of lengths of the respective sections or an average value or maximum value of bending angles of the respective sections. Thereby, even when the main duct 3 has a plurality of sections, more appropriate installation conditions can be calculated, taking into account the difference in shape of each section.

Then, the calculation unit 23 outputs condition information indicating the calculated installation conditions to the communication unit 21. In addition, the calculation unit 23, for example, associates and stores the cable information used in the calculation, the duct information, and the calculated installation conditions in the storage unit 22.

When the communication unit 21 receives the condition information from the calculation unit 23, the communication unit 21 transmits the condition information to the terminal 10 via the external network 40 and the wireless base station 41. When the terminal 10 receives the condition information transmitted from the management device 20, the terminal 10 displays the installation conditions indicated by the condition information on a screen of the terminal 10.

Note that the cable information stored in the first code 15 is not limited to the values of various parameters related to the installation of the cable 1, and may also be identification information corresponding to the values. Identification information is information that can define various parameter values of the cable 1, such as a type or a number of a product. Similarly, the duct information stored in the second code 31 is not limited to the values of various parameters related to the installation of the main duct 3, and may also be identification information corresponding to the values. Identification information is information that can define various parameters of the main duct 3, such as a type or a number of a product. In addition, the identification information may include a letter, a sign, a symbol, or the like corresponding to a distance from the reference point.

For example, in the storage unit 22 of the management device 20, a first correspondence table showing a correspondence between the values of various parameters related to the installation of the cable 1 and the identification information is stored. In addition, in the storage unit 22, a second correspondence table showing a correspondence between the values of various parameters related to the installation of the main duct 3 and the identification information is stored. When the calculation unit 23 in the management device 20 receives the identification information as the cable information, the calculation unit 23 can, for example, refer to the first correspondence table to obtain the values of various parameters corresponding to the identification information. Additionally, when the calculation unit 23 receives the identification information as the duct information, the calculation unit 23 can, for example, refer to the second correspondence table to obtain the values of various parameters corresponding to the identification information.

(Update of Calculation Formulas Used to Calculate Installation Conditions)

After installing the cable 1, the management device 20 may calculate a length of the cable 1 after installation. For example, a worker causes the terminal 10 to read both the first code 15 attached to the first end and the first code 15 attached to the second end of both ends of the cable 1 after installation. After reading the cable information, the terminal 10 displays, on a screen, an instruction button (not shown) for instructing, for example, calculation of a length of the cable 1. When the worker selects the instruction button, the terminal 10 transmits the two pieces of cable information and the instruction information for instructing calculation of a length of the cable 1 to the management device 20.

When the communication unit 21 in the management device 20 receives the two pieces of cable information and the instruction information transmitted from the terminal 10, the communication unit 21 outputs the two pieces of cable information and the instruction information to the calculation unit 23. Then, the calculation unit 23 calculates a length of the cable 1 after installation based on the two pieces of cable information and the instruction information output from the communication unit 21.

Specifically, the calculation unit 23 calculates a length of the cable 1 after installation by using the position information included in the cable information stored in the first code 15 on the first end and the position information included in the cable information stored in the first code 15 on the second end, i.e., by subtracting the position information.

In addition, the calculation unit 23 refers to the installation conditions of the cable 1 stored in the storage unit 22, and compares the estimated blowing distance of the cable 1 before installation and the length of the cable 1 after installation. It is assumed that a difference between the estimated blowing distance of the cable 1 before installation and the length of the cable 1 after installation exceeds a predetermined value. In this case, the calculation unit 23 updates the calculation formula such as changing a coefficient of the calculation formula stored in the storage unit 22 so that the estimated blowing distance is closer to the length of the cable 1 after installation. This makes it possible to increase the calculation accuracy of the estimated blowing distance for next and subsequent times.

Note that when the first end or the second end of the cable 1 after installation is the reference point, the worker may cause the terminal 10 to read only the cable information stored in the first code 15 attached to an end portion other than the reference point of both ends of the cable 1 after installation, and may select the instruction button displayed on the screen of the terminal 10. In this case, the terminal 10 transmits the one piece of read cable information and the instruction information to the management device 20.

When the management device 20 receives the one piece of cable information and the instruction information from the terminal 10, the management device 20 calculates a length of the cable 1 after installation based on the position information included in the cable information. That is, the distance from the reference point indicated by the cable information is calculated as a length of the cable 1 after installation. Also in this case, the calculation unit 23 updates the calculation formula stored in the storage unit 22 in accordance with the comparison between the estimated blowing distance of the cable 1 and the length of the cable 1 after installation.

<Flow of Operation>

Figure 5:
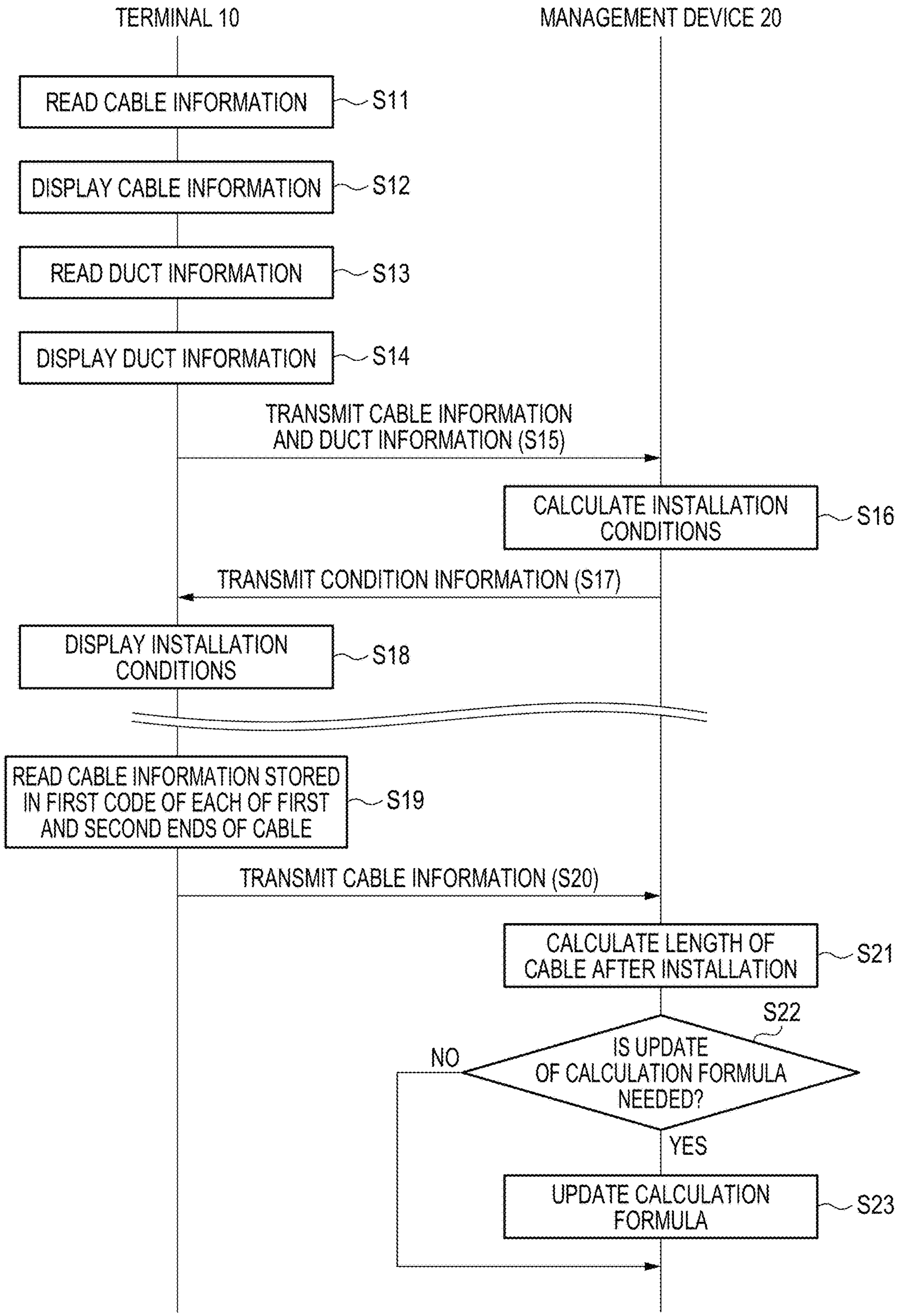
FIG. 5 is a sequence diagram for illustrating a flow of operation of the information management system shown in FIG. 2.

Next, a flow of operation of the information management system according to the embodiment of the present disclosure will be described. FIG. 5 is a sequence diagram for illustrating a flow of operation of the information management system shown in FIG. 2. Referring to FIG. 5, first, a worker who installs the cable 1 checks one of the plurality of first codes 15 before the installation work, and captures the first code 15 with the terminal 10. Thereby, the terminal 10 reads the cable information stored in the first code 15 (step S11).

Figure 6:
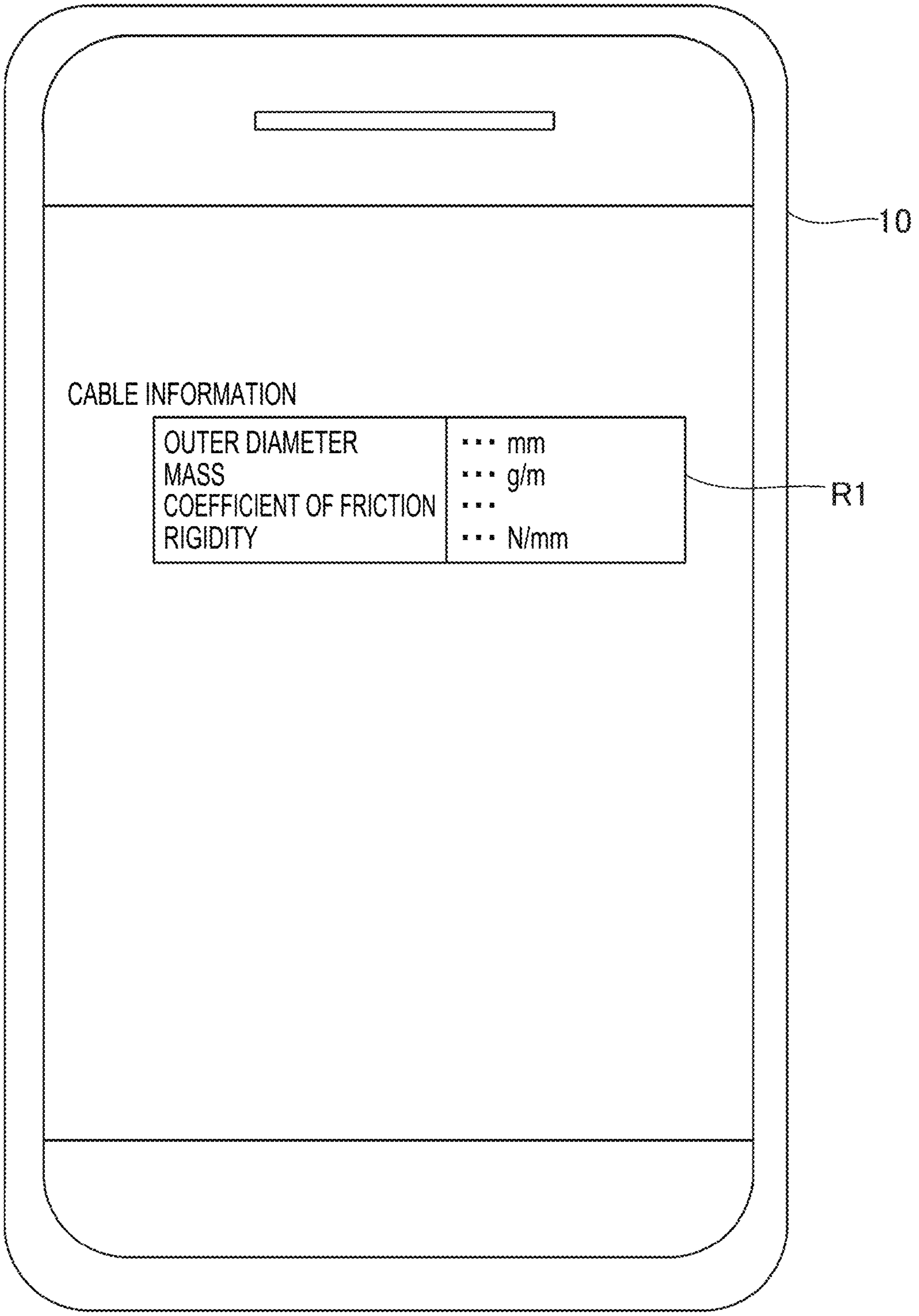
FIG. 6 is a view for illustrating a state in which cable information is displayed on a terminal shown in FIG. 2.

Next, the terminal 10 displays, for example, the read cable information on the screen provided to the terminal 10 (step S12). FIG. 6 is a view for illustrating a state in which the cable information is displayed on the terminal 10 shown in FIG. 2. In FIG. 6, as an example, a list of an outer diameter, a mass, a coefficient of friction, and a rigidity of the cable 1 is displayed as the cable information in a region R1 on the screen of the terminal 10.

Referring again to FIG. 5, next, the worker checks one of the plurality of second codes 31 (refer to FIG. 1) attached to the main duct 3 and captures the second code 31 with the terminal 10. Thereby, the terminal 10 reads the duct information stored in the second code 31 (step S13). Then, the terminal 10 displays, for example, the read duct information on the screen provided to the terminal 10 (step S14).

Figure 7:
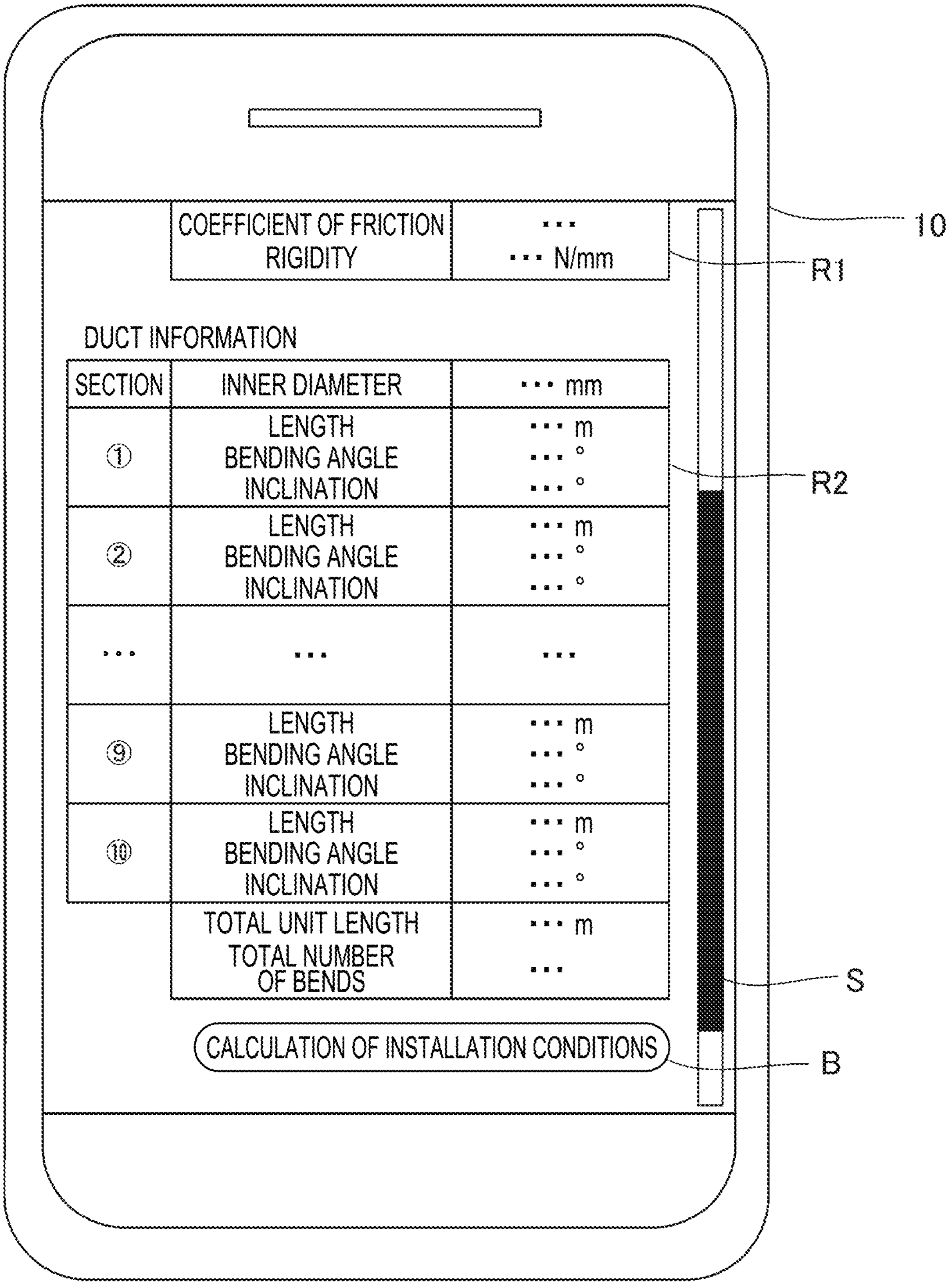
FIG. 7 is a view for illustrating a state in which duct information is displayed on the terminal shown in FIG. 2.

FIG. 7 is a view for illustrating a state in which the duct information is displayed on the terminal 10 shown in FIG. 2. In FIG. 7, as an example, a list of a length, a bending angle, and an inclination of each section of the main duct 3 is displayed as the duct information in a region R2 on the screen of the terminal 10.

Specifically, the terminal 10 displays, for example, the region R1 for indicating the cable information and the region R2 for indicating the duct information on a single window, and additionally displays a calculation button B for instructing the management device 20 to calculate installation conditions on the screen. When a display region of the screen of the terminal 10 is smaller than a size of the window, for example, a scroll bar S is displayed on the screen.

Next, it is assumed that the worker performs an operation of selecting the calculation button B, such as pressing the calculation button B displayed on the screen of the terminal 10. In this case, the terminal 10 transmits the cable information and the duct information to the management device 20, as shown in FIG. 5 (step S15).

Next, when the management device 20 receives the cable information and the duct information transmitted from the terminal 10, the management device 20 calculates the optimal installation conditions when installing the cable 1 in the main duct 3 based on the cable information and the duct information (step S16), and transmits condition information indicating the calculated installation conditions to the terminal 10 (step S17).

Figure 8:
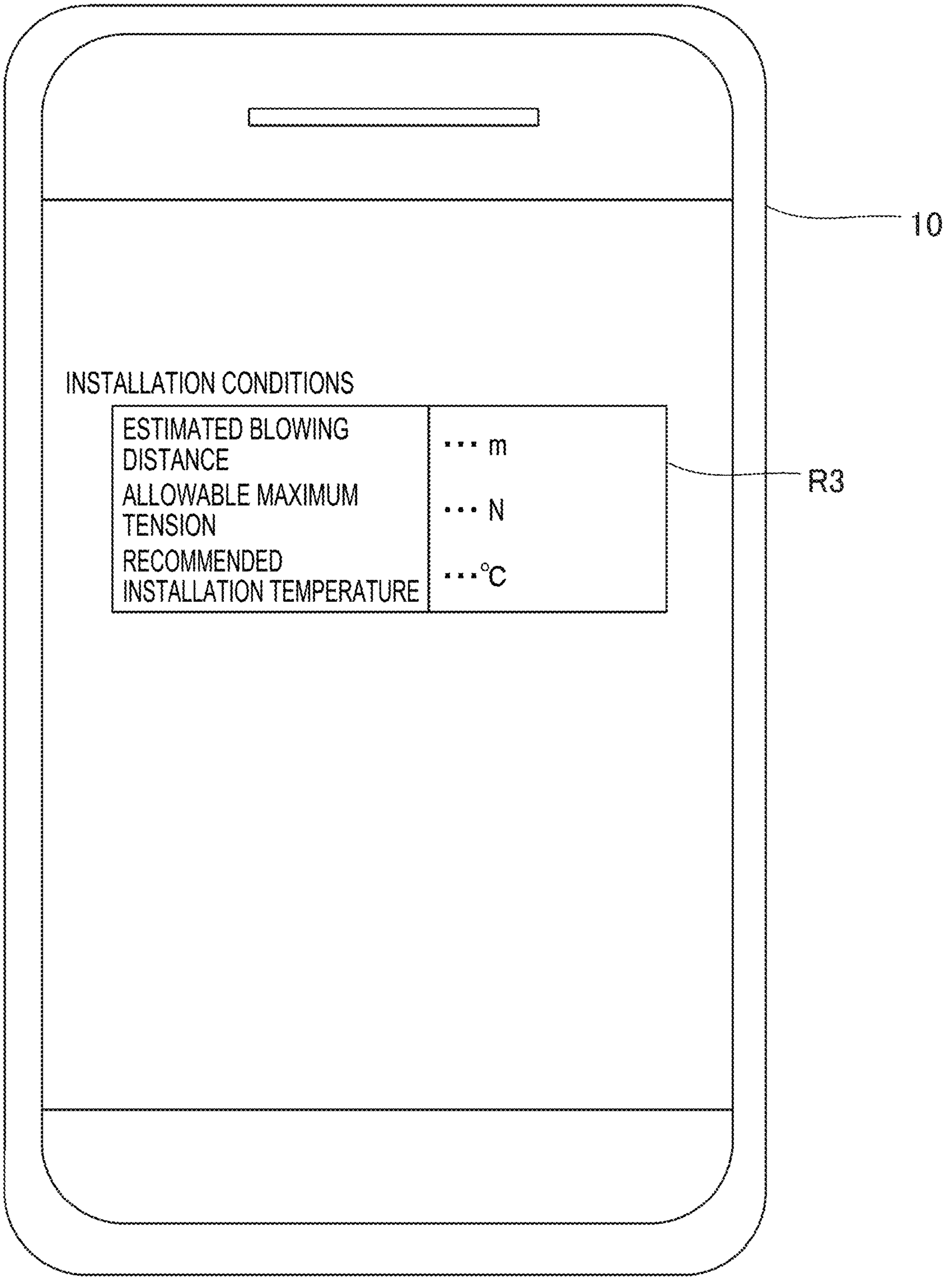
FIG. 8 is a view for illustrating a state in which condition information is displayed on the terminal shown in FIG. 2.

Then, when the terminal 10 receives the condition information transmitted from the management device 20, the terminal 10 displays the installation conditions indicated by the condition information on the screen (step S18). FIG. 8 is a view for illustrating a state in which the condition information is displayed on the terminal 10 shown in FIG. 2. In FIG. 8, as an example, a list of optimal installation conditions such as an estimated blowing distance, an allowable maximum tension, and a recommended installation temperature is displayed in a region R3 on the screen of the terminal 10.

In this way, the recommended installation conditions are automatically calculated based on the first code 15 attached to the cable 1 and the second code 31 attached to the main duct 3, and are then displayed on the terminal 10 of the worker, so the worker can easily obtain the recommended installation conditions at an installation site. In addition, even a less-experienced worker in the installation work can perform the installation work of the cable 1 more appropriately by obtaining the recommended installation conditions.

Referring again to FIG. 5, it is assumed that after installing the cable 1, the worker captures the first code 15 attached to the first end of the cable 1 and the first code 15 attached to the second end of the cable 1 with the terminal 10. In this case, the terminal 10 reads the cable information stored in the first code 15 for each of the first and second ends of the cable 1 after installation (step S19).

Next, it is assumed that the worker performs an operation of instructing the terminal 10 to transmit the cable information to the management device 20. In this case, the terminal 10 transmits the two pieces of cable information corresponding to the first and second ends of the cable 1 after installation to the management device 20 (step S20).

Next, the management device 20 calculates a length of the cable 1 after installation based on the two pieces of cable information corresponding to the first and second ends of the cable 1 after installation (step S21). Next, the management device 20 determines whether the calculation formula used to calculate the installation conditions needs to be updated based on the estimated blowing distance of the cable 1 calculated in step S16 and the length of the cable 1 after installation (step S22).

For example, when the difference between the estimated blowing distance and the length of the cable 1 after installation exceeds a predetermined value, the management device 20 determines that the calculation formula needs to be updated ("YES" in step S22), and updates the calculation formula so that the estimated blowing distance is closer to the length of the cable 1 after installation (step S23). On the other hand, for example, when the difference between the estimated blowing distance and the length of the cable 1 after installation is equal to or less than a predetermined value, the management device 20 determines that the calculation formula does not need to be updated ("NO" in step S22), and does not update the calculation formula.

Note that in FIG. 5, reading of the cable information (step S11) and display of the cable information (step S12), and reading of the duct information (step S13) and display of the duct information (step S14) may be reversed in order.

In addition, the terminal 10 is not limited to the smart phone, and may also be an augmented reality (AR) glass or the like. Additionally, a two-dimensional code or a one-dimensional code other than the QR code may be laser engraved on at least one of the cable 1 and the main duct 3.

Additionally, the terminal 10 shown in FIG. 2 may have the function of the calculation unit 23 in the management device 20. For example, calculation of installation conditions based on the cable information and the duct information may be performed using an application program installed in the terminal 10.

<Modifications>

Referring again to FIG. 2, after installation the cable 1, the management device 20 may not only calculate the length of the cable 1 after installation but may also associate and store the cable information on the cable 1 and the duct information on the main duct 3 in which the cable 1 is installed.

For example, after installing the cable 1, the worker causes the terminal 10 to read any one of the plurality of first codes 15 attached to the cable 1. In addition, after installing the cable 1, the worker causes the terminal 10 to read any one of the plurality of second codes 31 attached to the main duct 3 in which the cable 1 is installed. Then, the terminal 10 transmits the read cable information and duct information to the management device 20, in response to an operation of the worker.

When the communication unit 21 in the management device 20 receives the cable information and duct information transmitted from the terminal 10, for example, the management number of the cable 1 included in the cable information, the management number of the main duct 3 included in the duct information, the date of receipt of the cable information and duct information, the identification information of the terminal 10, and the like are associated and stored in the storage unit 22. In this way, since the information on installation is integrated and stored after completion of installation, it becomes possible to present useful information to a worker when performing maintenance and management, and the like.

Although the present disclosure has been described with reference to the specific embodiment, the present invention is not limited to these examples, is defined by the claims, and is intended to include all changes made within the meaning and scope equivalent to the claims.

What is claimed is:

1. An information management system comprising:

an obtaining unit configured to obtain cable information on installation of a cable and duct information on installation of a duct in which the cable is to be installed; and a calculation unit configured to calculate an installation condition that is recommended when installing the cable inside the duct, based on the duct information and the cable information, wherein the cable information is stored in at least one first code attached to the cable, wherein the duct information is stored in at least one second code attached to the duct, wherein the at least one first code comprises a plurality of first codes attached to the cable along a longitudinal direction of the cable, wherein the cable information stored in each of the plurality of first codes comprises position information indicating a position where a corresponding one of the plurality of first codes is attached, wherein the obtaining unit is configured to obtain the position information of at least one of the plurality of first codes after installation of the cable, and wherein the calculation unit is configured to calculate a length of the installed cable based on the position information obtained by the obtaining unit.

2. The information management system according to claim 1, wherein the duct comprises a plurality of sections, and wherein the duct information comprises information on installation of the duct in each of the sections.

3. The information management system according to claim 1, further comprising a storage unit configured to store the cable information and the duct information in association with each other.

4. The information management system according to claim 3, wherein the storage unit stores a calculation formula, and wherein, after installation of the cable, the calculation unit is configured to compare an estimated blowing distance of the cable calculated before installation and the length of the cable after installation, and when a difference between the estimated blowing distance and the length of the cable after installation exceeds a predetermined value, the calculation unit is configured to update the calculation formula so that the estimated blowing distance is closer to the length of the cable after installation.

5. The information management system according to claim 1, wherein the obtaining unit comprises a terminal configured to be used by a worker at an installation site, the terminal having a capture function configured to capture the at least one first code and the at least one second code, and a display function, wherein the information management system further comprises a management device wirelessly connected to the terminal, wherein the management device includes a communication unit configured to receive the cable information and the duct information transmitted from the terminal, and wherein the calculation unit is configured to calculate the installation condition based on the cable information and the duct information received by the communication unit, and to output condition information indicating the calculated installation condition to the communication unit.

6. An information management method comprising:

obtaining cable information on installation of a cable, the cable information being stored in at least one first code attached to the cable;

obtaining duct information on installation of a duct in which the cable is to be installed, the duct information being stored in at least one second code attached to the duct; and calculating an installation condition that is recommended when installing the cable inside the duct, based on the duct information and the cable information, wherein the at least one first code comprises a plurality of first codes attached to the cable along a longitudinal direction of the cable, and wherein the cable information stored in each of the plurality of first codes comprises position information indicating a position where a corresponding one of the plurality of first codes is attached.

7. The information management method according to claim 6, wherein the method further comprises, after installation of the cable, obtaining the position information of at least one of the plurality of first codes, and wherein the method further comprises calculating a length of the installed cable based on the obtained position information.

* * * * *